Aug. 14, 1962 T. A. HINDERER 3,049,635
CONTROL FOR IMPULSE COUPLING
Filed May 9, 1960
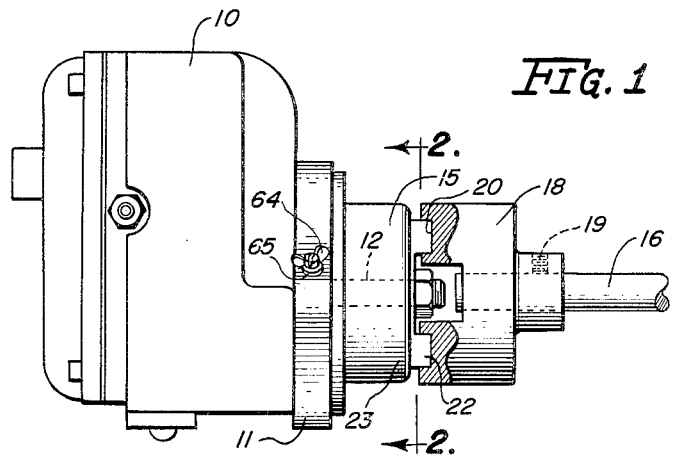
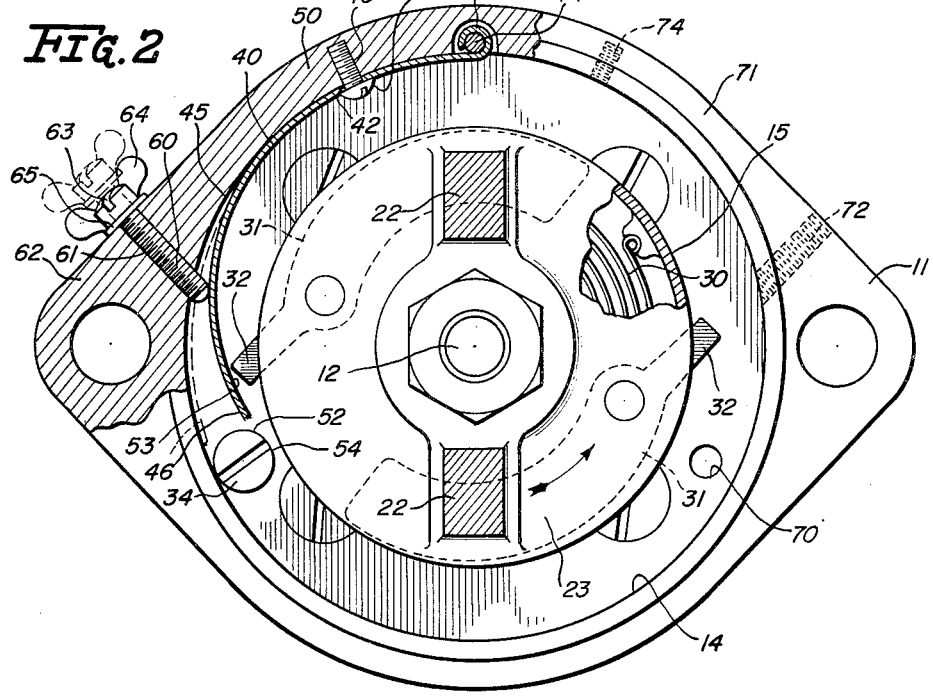
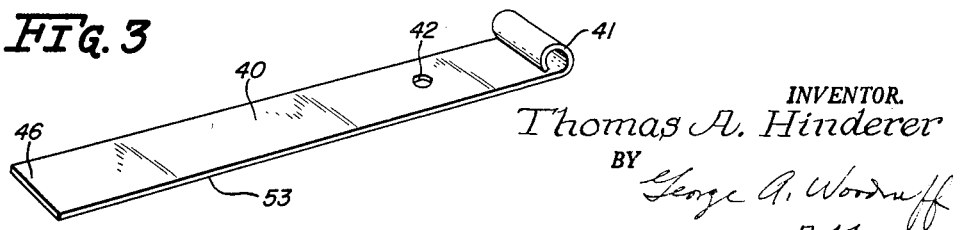
INVENTOR.
Thomas A. Hinderer
BY George A. Woodruff
Atty.

United States Patent Office 3,049,635
Patented Aug. 14, 1962

3,049,635
CONTROL FOR IMPULSE COUPLING
Thomas A. Hinderer, Beloit, Wis., assignor to Fairbanks, Morse & Co., Chicago, Ill., a corporation of Illinois
Filed May 9, 1960, Ser. No. 27,576
5 Claims. (Cl. 310—84)

This invention relates to impulse couplings employed in the drive connections to magneto generators provided for supplying fuel ignition current in internal combustion engines.

As is well known in connection with engine driven ignition generators of the magneto type, the magneto output during engine cranking and at low starting speeds is usually insufficient to assure quick and positive fuel ignition. Consequently, it is the usual or customary practice to employ in the engine drive connection to the magneto, a means such as an impulse coupling for boosting the magneto rotor speed during engine starting. Normally this is accomplished by ignition timing retardation such as to prevent or insure against so-called engine backfire. While there are a number of different forms and constructions of impulse couplings for the purpose, the present invention is concerned more particularly with the centrifugal pawl and stop type of coupling. In such coupling, a weighted pawl on a rotating part of the coupling, provides a nose portion for momentary abutment with a fixed stop to permit energy storage in an impulsing means such as a spring. Following energy storage as by spring wind-up, a cam on a rotary part of the coupling engages the pawl to release the same from the stop, and thereby releases the spring to cause impulse or rapid rotation of the magneto rotor for obtaining engine ignition. That action is repeated during engine starting, until the engine driven speed of the magneto rotor reaches a value sufficient to result in centrifugal force retraction of the coupling pawl to a position out of range of the stop.

Once the engine is started and in normal operation, the coupling performs as a direct drive connection from the engine to the magneto. However, as is often encountered in the operation of couplings of the type indicated, if the engine is throttled down or otherwise brought to a low or idling speed, centrifugal force response of the weighted pawl may be and frequently is insufficient to retain the pawl from outward projection and contact with the stop. When this happens, the coupling undergoes its magneto impulsing function, which then is unnecessary as engine idling speed drive of the magneto usually is sufficient for effective ignition. Consequently, the impulsing elements of the coupling are at such time subjected to unnecessary wear and tear, which is accentuated by reason of the higher idling speed as compared to cranking and starting speeds.

It is the primary object of the invention, therefore, to provide novel and effective means for preventing impulsing operation of the coupling during engine operations at low or idling speeds.

Another object is to provide for a pawl and stop type impulse coupling, improved means selectively operable to and from a condition effective for preventing coupling pawl engagement with the stop.

Another object is to afford a selectively operable means for the purpose indicated, which is readily reversible in application to a reversible impulse coupling, to accommodate engine magneto drive in either clockwise or counterclockwise direction.

Other objects and advantages will appear from the following description of one embodiment of the invention as herein illustrated by the accompanying drawing, wherein:

FIG. 1 is a view in side elevation of a magneto generator and impulse drive coupling, showing drive coupling connection to generator drive means such as a rotating element or shaft of an internal combustion engine, FIG. 2 is an enlarged end view of the magneto generator and drive coupling showing one form of the present invention in application thereto, this view being taken from line 2—2 in FIG. 1 and illustrating in outline certain parts of the coupling, and FIG. 3 is a perspective view of a flexible member or leaf spring embodied in the present invention.

Illustrated in FIG. 1 is a magneto generator 10 having a mounting portion or flange 11 by which the generator is mounted on or in association with its drive means, as an internal combustion engine (not shown) having a fuel ignition system to be supplied with ignition current from the generator. The magneto may be of any suitable or conventional form, having a rotor (not shown) supported by a shaft 12 projecting outwardly through the mounting flange portion 11. Arranged on the shaft 12 and extending in the circular recess 14 (FIG. 2) of the mounting flange, is an impulse drive coupling device or unit 15. Coupling 15 provides for magneto drive connection with a drive means, as the shaft 16 which may be a cam shaft of an internal combustion engine. Such connection is here shown to include a drive bracket 18 carried on and rotatable with shaft 16, the bracket being suitably keyed or secured to the shaft, as by the set screw 19. The bracket provides recesses or sockets 20 receiving square or rectangular projections or dogs 22 secured on the forward end of the drive coupling case 23, thereby providing the drive connection through the coupling to the magneto.

The impulse drive coupling unit 15 is of conventional type well known in the art, and so it is deemed unnecessary here to show the construction thereof in detail. However, for the purpose of the present invention, it is noted that the coupling is of pawl and spring type. It includes an impulse drive spring indicated in part at 30, and a pair of pivotal weighted pawls 31 shown in broken outline, except for the nose end 32 of each pawl which is shown in projection from the periphery of the coupling unit. Associated with the coupling unit but carried by the magneto mounting flange 11 (FIG. 2), is a pawl engageable step 34 which may be in the form of a suitable round pin or stud. The stop projects in the flange recess 14, in the path of movement of the pawl nose ends 32 when projecting from the coupling. Pawls 31 are adapted and arranged for centrifugal force response such that when the coupling is rotated below a certain minimum or pawl retracting speed, each pawl then is free to assume a position having the nose end 32 projecting from the coupling for abutment with the stop 34. At and above the minimum speed, the weighted pawls respond to centrifugal force by assuming retracted positions wherein the nose ends 32 thereof are within the peripheral confines of the coupling, thus out of range of abutment with stop 34.

In engine drive of the magneto, the impulse coupling operates in the following manner. During engine starting and consequent starting drive of the magneto, when the drive speed is below pawl retracting speed as aforesaid, the impulse coupling effects successive accelerated drive rotations of the magneto rotor to attain ignition current output adequate for positive fuel ignition in the starting period. The accelerated starting drive of the magneto results from momentary abutment of each pawl nose end 32 with the stop 34, at which time the impulse spring 30 is tensioned or wound-up. Cam means (not shown) in the coupling then engages the stop-engaged pawl to release or kick the pawl from the stop, thereby releasing the tensioned impulse spring for producing accelerated drive of the magneto rotor. This action is repeated in rapid succession as the pawls successively abut the stop, with following kick-off or release therefrom. When the engine attains operation with magneto drive speed at or above the aforesaid minimum speed, the coupling pawls retract under the influence of centrifugal force, so that they are then removed from abutment action with the stop. The coupling thereupon and during normal engine operation, functions as a direct drive coupling between the engine and magneto. The foregoing briefly described operation of the spring and pawl type impulse coupling is well known in the art, as is the construction thereof to attain the indicated result.

However, as sometimes happens in the operation of pawl type couplings as herein indicated, the pawls do not remain retracted under low or idling operational speed of the engine. The result then is that the coupling undergoes its impulse acceleration drive of the magneto, such being unnecessary under the indicated condition because engine idling speed drive of the magneto usually is sufficient to produce effective idling speed fuel ignition. Consequently, the impulsing elements of the coupling are thereby subjected to unnecessary wear and tear, and particularly in accentuated degree due to the higher idling speed as compared to cranking and starting speeds.

The primary object of the present invention, therefore, is to provide novel and effective means for preventing impulsing operations of the coupling during low or idling engine speeds. Referring to FIGS. 2 and 3, there is provided a flat, elongate or strip-form member 40 of flexible character, preferably a leaf spring formed of suitable spring steel or the like. The member has one end reversely turned to provide a mounting eye portion 41, and is provided with an aperture 42 near the eye portion. At a suitable point in the recess 14 of magneto flange 11 is a pin 44. In mounted condition, the spring member 40 has the pin 44 received in its eye portion 41, and extends along the curved inner side surface 45 of the flange recess 14 toward the stop 34, with the free end portion 46 of the member terminating near the stop. A screw 48 through the aperture 42 and threaded in an opening 49 in flange wall portion 50, retains the member in assembly to the flange. The length of the spring member 40 is predetermined with regard to the relative locations of the pin 44 and the stop 34, such that the member in its active position (full line showing in FIG. 2) wherein it is deflected inwardly from the curved flange surface 45, has the free end portion 46 terminating closely adjacent the stop 34 in the pawl abutment side region 52 of the latter. Moreover, the inner side face of the free end portion 46 provides a pawl camming surface 53 which, in the active position of the member, is substantially tangentially related to the innermost side 54 of the stop.

In its inactive position, the spring member lies along the flange surface 45, with the end portion 46 disposed as shown in broken lines in FIG. 2. The curved flange surface 45 constrains the member to a corresponding curvature, thus placing the member under stress in the direction to bias its end portion 46 away from stop 34 to the inactive position illustrated.

As appears in FIG. 2, location of the spring member 40 in its active or inactive position is determined through a manually operable screw 60 threaded through an opening 61 in the flange wall portion 62, and engageable with the rear side of the spring member near the end portion 46 of the latter. The screw 60 is shown in the present example as a thumb screw, having the wing head 64 for ready manual operation, and including a screw head slot 63 permitting screw-driver turning of the screw should that be desired. Moreover, the screw is of a length such that when fully entered with its head abutting flange wall 62 (through a washer 65), the spring member will be thereby displaced or flexed to its active position shown. Close control as to the desired active position of the member 40, or any adjustment in respect thereto, may be readily effected by employing a washer 65 of one or another thickness, or several washers. Displacement of the spring member 40 to its inactive position, results upon backing-off of the screw 60 which permits self-return of the member under its stress-biased condition hereinbefore noted.

It will appear now from the foregoing description, that when it is desired to prevent impulsing operation of the drive coupling, as under low or idling operation of the engine, the screw 60 is fully entered to dispose the spring member 40 in its active position. As so positioned, the spring end portion 46 substantially masks the stop 34 at its pawl abutment side region 52, thereby preventing abutment of the nose end 32 of either pawl 31 with the stop. Moreover, as the then projecting pawl nose end 32 approaches the stop, it engages and rides along the cam surface 53 of member 40, to and over the inner side 54 of the stop. Thus, the spring member 40 in its active position, effectively cams the pawls away from the stop. Retracting screw 60 causes return of the member 40 to inactive position, thereby freeing the stop 34 for pawl abutment in any subsequent desired impulsing operation of the drive coupling.

It is to be noted that the stop 34 and the spring member 40 are located for operational cooperation with the impulse coupling unit 15 adapted for counterclockwise rotation as viewed in FIG. 2. However, it is well known to construct impulse couplings such as to have their operating parts readily reversible, whereby to render the coupling adaptable to either direction of rotation. Considering the unit 15 to be so adaptable, where clockwise coupling rotation is intended, then it is necessary only to apply the coupling with its parts reversed, and to dispose the stop 34 and spring member 40 on the opposite side of the flange recess, in like positions relative to each other and to the coupling as herein described in connection with the counterclockwise rotating coupling. To accommodate ready re-location of the latter parts for a clockwise rotating coupling, the flange 11 has a mounting opening 70 for receiving the stop 34, and the flange wall 71 has a threaded opening 72 for screw 60 and a threaded opening 74 for screw 48. In the present example, the pin 44 is located to have the same angular spacing relative to the stop 34 whether disposed as shown in solid lines in FIG. 2 or re-located in the opening 70. Thus, the eye portion 41 of the spring member 40 is received on the pin in either operative position of the member.

Regarding the screw 60 as here provided for determining active and inactive positioning of the spring member 40, it is illustrated as a thumb screw for direct manual operation, but including the head slot 63 to facilitate manual turning of the screw by means of a screw driver or other suitable tool. While this requires screw manipulation at a point close to the magneto and coupling assembly, operation of the screw may be effected remotely from the assembly, as by any suitable drive connection to the screw (not shown).

Having now described and illustrated a presently preferred embodiment of the invention, it is to be understood that other embodiments thereof are herein contemplated within the scope of the invention as hereinafter defined and claimed.

What is claimed is:

1. The combination with a magneto generator and drive means therefor including an impulse drive coupling for accelerating starting drive of the generator, wherein the generator provides a fixed stop adjacent the drive coupling and the coupling includes a movable centrifugal force responsive pawl for successive abutment with and release from the stop to effect accelerated starting drive of the generator, of a cam element movably carried by the generator, said cam element being movable to and from a camming position relative to the stop, and the element in said camming position serving to cam the pawl away from abutting engagement with the stop.

2. The combination with a magneto generator and drive means therefor including an impulse drive coupling for accelerating starting drive of the generator, wherein the generator provides a fixed stop adjacent the drive coupling and the coupling includes a movable centrifugal force responsive pawl for successive abutment with and release from the stop to effect accelerated starting drive of the generator, of a cam element movably carried by the generator, means on the generator engageable with the cam element and operable to cause movement of the cam element selectively to and from a camming position relative to the stop, and the element in said camming position serving to cam the pawl away from abutting engagement with the stop.

3. The combination with a magneto generator and drive means therefor including an impulse drive coupling for accelerating starting drive of the generator, wherein the generator provides a fixed stop adjacent the drive coupling and the coupling includes a movable centrifugal force responsive pawl for successive abutment with and release from the stop to effect accelerated drive of the generator, of means operable for preventing pawl abutment with the stop, comprising a flexible strip form element carried by the generator and providing an end portion terminating near the stop, and means on the generator for flexing said element to a position having said end portion thereof substantially masking the stop from abutment by the coupling pawl.

4. The combination with a magneto generator and drive means therefor including an impulse drive coupling for accelerating starting drive of the generator, wherein the generator provides a fixed stop adjacent the drive coupling and the coupling includes a movable centrifugal force responsive pawl for successive abutment with and release from the stop to effect accelerated drive of the generator, of means operable for preventing pawl abutment with the stop, comprising a leaf spring element carried by the generator and providing an end portion terminating near the stop, means placing the element under stress in the direction to bias said end portion thereof away from the stop, and means operable to flex said element to a position having said end portion thereof substantially masking the stop from abutment by the coupling pawl.

5. The combination with a magneto generator and drive means therefor including an impulse drive coupling for accelerating starting drive of the generator, wherein the generator provides a fixed stop adjacent the drive coupling and the coupling includes a movable centrifugal force responsve pawl for successive abutment with and release from the stop to effect accelerated drive of the generator, of means operable for preventing pawl abutment with the stop, comprising a leaf spring element secured near one end to the generator and having its opposite end portion terminating near the stop, said opposite end portion providing a pawl engageable cam surface, means placing the element under stress in the direction to bias said end portion to an inactive position away from the stop, and means operable to flex the element to an active position having said end portion substantially masking the stop from pawl abutment therewith, the element in said active position locating said cam surface relative to the stop such as to effect upon pawl engagement therewith, camming of the pawl over the stop.

References Cited in the file of this patent

UNITED STATES PATENTS 1,376,024    Matthews _____ Apr. 26, 1921

FOREIGN PATENTS 120,160    Australia _____ July 4, 1945
855,614    France _____ Feb. 19, 1940
904,029    France _____ Feb. 12, 1945